Sept. 1, 1959 A. H. FRÖHLICH ET AL 2,901,772
SEALING RING FOR RECAPPING PRESSES
Filed July 30, 1956 2 Sheets-Sheet 1

INVENTORS
ADOLF FRÖHLICH &
EDWARD J. HARRIS
BY
*J. William Freeman*
ATTORNEY

INVENTORS
ADOLF FRÖHLICH &
EDWARD J. HARRIS

United States Patent Office 2,901,772
Patented Sept. 1, 1959

2,901,772

SEALING RING FOR RECAPPING PRESSES

Adolf H. Fröhlich and Edward J. Harris, Akron, Ohio, assignors to The Cleveland Trust Company, Cleveland, Ohio, as trustee Application July 30, 1956, Serial No. 600,904

15 Claims. (Cl. 18—18)

This invention relates to the art of vulcanizing pneumatic tires, and in particular has reference to improvements in sealing rings for use in vulcanizing presses.

In the art of vulcanizing pneumatic tires during a recapping operation wherein new tread stock is applied to the exterior crown region of the pneumatic tire, it has previously been attempted to position an inflexible endless ring between the opposed inner bead portions of the worn pneumatic tire and then place this sub-assembly, as defined by the pneumatic tire and the positioned ring, into a recapping press where vulcanizing pressure can be applied to vulcanize the newly added tread stock to the crown region of the tire.

A typical press of this general type is set forth in copending application Serial No. 583,777, filed May 9, 1956, by Adolf H. Frohlich and Edward J. Harris.

As an inherent disadvantage, it has been found difficult in the past to axially position this endless ring with respect to the opposed beaded surfaces of the tire. In addition to being time-consuming with a resultant increase in cost, it has been found that unless this ring is accurately and carefully positioned, an improper sealing will occur between the bead portions with the result that insufficient air pressure will be present inside the tire so that the same cannot be effectively urged outwardly against the mold sections to effectuate the proper cure between the tire body and the recapping portion being applied thereto during the recapping operation.

It has additionally been found difficult to position this endless ring between the bead portion in view of the fact that the same is of a larger diameter than the extreme radial inner bead wall of the pneumatic tire with the result that these bead walls must be spread and the tire manually positioned, segment by segment, between the bead walls to overcome the difference in diameters of the ring and bead portions respectively.

It has been found that the aforementioned difficulties can be obviated if the endless ring normally employed in recapping operations, is hinged into two semi-hemispherical segments that are hinged about a transverse, diametrically extending, rod so that the ring segments may be collapsed to a reduced diameter that will easily pass through the bead portions of the tire.

It accordingly becomes a principal object of this invention to provide an improved type sealing ring characterized by a hinged type of construction wherein the same is capable of being positioned within formed tires of varying dimensions, with a minimum amount of difficulty.

It is a still further object of this invention to provide an improved type of sealing ring for recapping operations characterized by a hinge type construction with movement between a reduced diameter and a maximum diameter position thereof being effectuated upon timed coaction with the movable mold sections of the standard or prior art type vulcanizing presses normally employed in recapping operations.

It is a still further object of this invention to provide an improved type of sealing ring that is capable of axial adjustment during its positioning to accommodate variations in bead thicknesses.

These and other objects of the invention will become more apparent upon the reading of the following brief specifications considered and interpreted in the light of the accompanying drawings.

Figure 2:
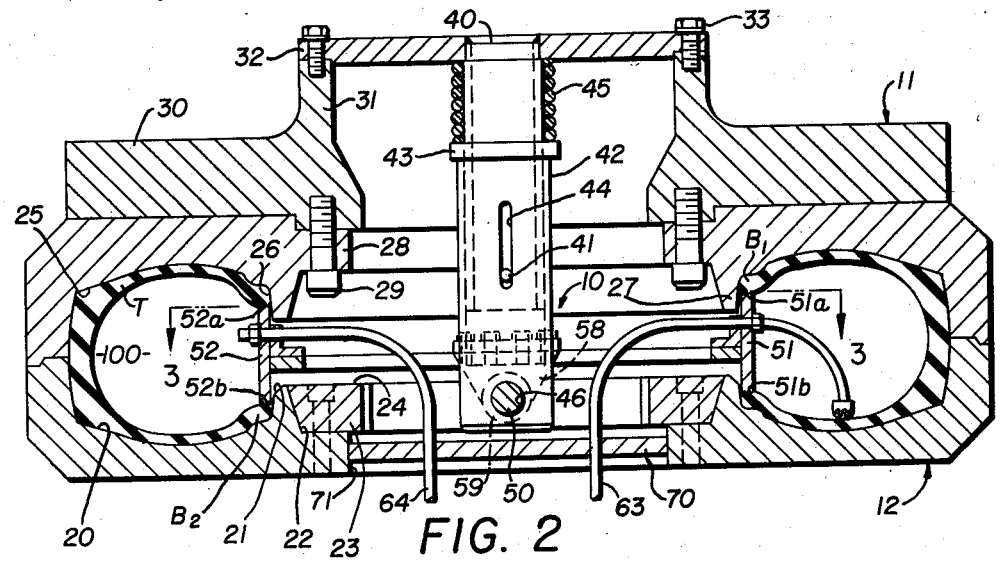
Figure 2 is a view similar to Figure 1 but showing the position of the component parts in the closed or curing position.
Figure 1:
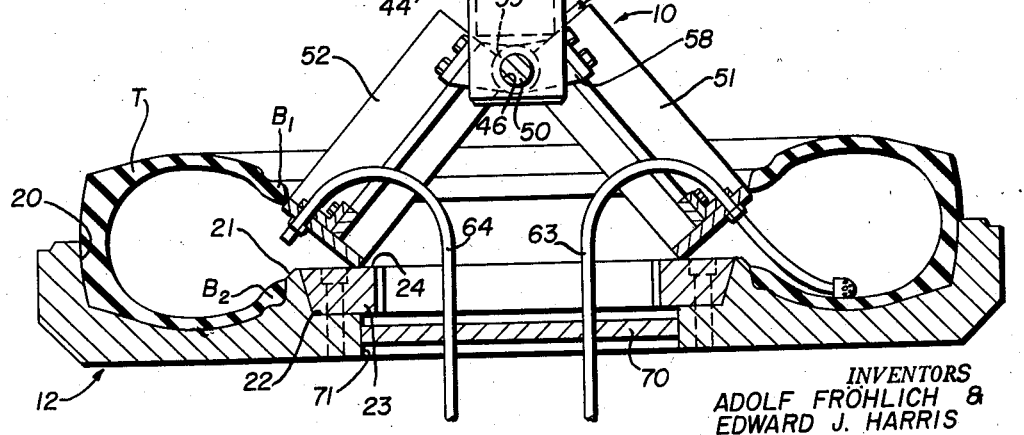
Figure 1 is a semi-schematic sectional view illustrating the position of the component parts in the open or initial stages of the recapping operation.
Figure 3:
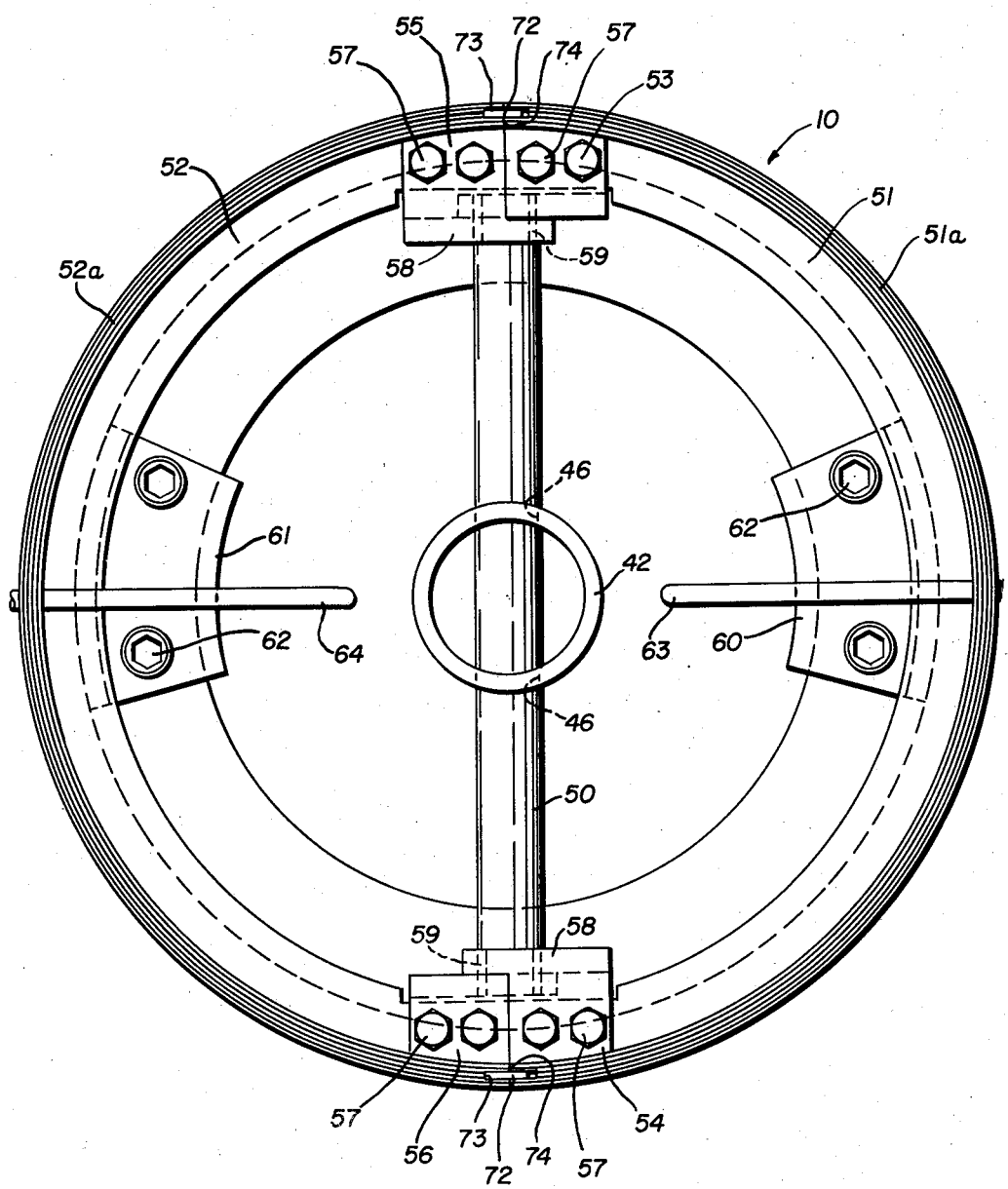
Figure 3 is a view taken on the lines of 3—3 of Figure 2.

Referring now to the drawings, and in particular to Figures 1 and 2 thereof, the improved sealing ring, generally designated by the numeral 10, is shown carried by an upper mold section 11 so as to be positioned between the beads of the tire T as shown in Figure 3, upon closing movement of the upper mold section 11 with respect to a fixed lower mold section 12.

Considering first the structure of the lower mold section 12, it will be seen from the drawings that the same is of the usual annular configuration and includes a design imparting surface 20 that includes a bead portion that is disposed adjacent inclined surface 21 as well as an undercut surface 22, with the latter (surface 22) being shown as receiving an endless ring 23 that includes an upper surface 24 that coacts with the sealing ring 10, as will presently be described.

By like token, the upper mold section 11 includes the usual design imparting surface 25, a bead seat 26, an annular rib portion 27, and a flange portion 28, the arrangement being such that the flange portion 28 is tapped to receive bolt 29 that in turn, threads into a head casting 30 with this head casting 30 including an upturned endless rib section 31 to which is attached a covering plate 32 by use of bolts 33 in known manner. In this manner, the head casting 30, the plate 32 and the mold section 12 all move as a unit upon actuation of the vulcanizing press which may be of any known type now used in the prior art.

To the end of supporting the ring 10 with respect to the upper mold section 11 as has been previously indicated, the plate 32 includes a centrally depending tubular member 40 that includes at its lower end, a projecting pin 41. Telescopically arranged about the tubular member 40 is a slightly larger diameter tubular member 42 that includes an end flange 43 and an elongated slot 44; the arrangement being such that the end flange 43 serves as a seat for spring 45 that surrounds the tubular member 40 and seats at its opposite end against the plate 32 as is clearly shown in Figures 2 and 3 of the drawings, while the elongated slot 44 serves to limit the axial amount of telescoping between the tubular members 40 and 42.

As is best shown in Figure 3 of the drawings, the ring 10 per se is supported with respect to the tubular member 42 as a result of being passed through apertures 46—46 that are provided in the lower end thereof, and in this manner it is believed apparent in this regard that bushings of known type are provided to facilitate mounting of the shaft member 50 with respect to the tubular member 42.

As previously indicated, the ring 10 is in actuality defined by two arcuate segments 51 and 52, each being of substantially semi-hemispherical configuration; the arrangement being such that the segment 51 has brackets 53 and 54 provided at its arcuate ends for reception about the opposed axial ends of the shaft 50 while similar brackets 55 and 56 are provided at the arcuate end of the ring member 52 for reception about the axial end of the shaft 50 as is clearly shown in the drawings. In this regard, it is to be noted that the bolts 57—57 are used for securing these brackets 53, 54, 55 and 56 with respect to the segments 51 and 52 respectively with each bracket including, as best shown in Figure 2, a depending flange 58 within the bushings 59 of which may be received the shaft 50. If desired, reinforcing brackets 60 and 61 (see Figure 3) may be secured to the ring segments 51 and 52 by bolts 62—62 for the purpose of reinforcing each ring member 51 and 52 in its medial portion.

In addition to the aforementioned component parts, each ring segment 51 and 52 includes opposed serrated edges 51a, 51b, 52a and 52b, that engage against the opposed internal beads of the pneumatic tire T when the parts are positioned as shown in Figure 2 of the drawings.

Also, as shown in Figures 1 and 2 of the drawings, the ring member 10 may include a flexible conduit 63, as well as an exhaust conduit 64 that are arranged so as to communicate the interior of the vulcanizing equipment. In this regard, in the event it is desired to completely seal off the open space between the bead walls of the tire, it is merely necessary that a plate such as plate 70 be positioned between to cover the cavity 71 that is defined by the lower mold section 12 as is shown in Figure 2 of the drawings, with the use of such a plate being optional to the requirements of the individual user.

In use or operation of the improved sealing ring 10, it will first be assumed that the mold sections 11 and 12 are in the open position of Figure 1 with the ring segments 51 and 52 being collapsed about the shaft 50 to present a reduced effective diameter as a result of the effect of gravity. It is to be noted that Figure 1 is a somewhat intermediate position of movement and does not represent the fully opened condition of the molds, and accordingly, the ring segments 51 and 52 would, in the fully open position of the vulcanizing press, be spaced somewhat with respect to the plate 23 so that the tire T could be seated against the design imparting surface 20 of the lower mold section 12 without any problem of interference between the same and the hinged or collapsed sealing ring 10.

When the tire T has been positioned and the upper mold section 11 lowered to the position of Figure 1, it will be noted that the serrated edge portions 51b and 52b of the ring segments 51, 52 are in contact with the upper surface 24 of the ring 23 and accordingly, upon further downward movement of the mold section 11, the ring segments 51 and 52 will pivot around the shaft 50 towards the flat or horizontal position of Figure 2.

In this regard, it is to be noted that the contact of the pin 41 with the lower end of the elognated slot 44 prevents further upward movement to the tubular member 42 with respect to the tubular member 40 so that this flattening or straightening condition of the ring segments 51 and 52 will be forced to occur as a result of the contact between pin 41 and slot 44. To aid initially in obtaining such movement, the surface 24 may be contoured to form a cam surface.

It is also to be noted that in the condition of Figure 1 the upper serrated edge portions 51a and 52a of the ring segments 51, 51 are slightly disposed under the upper or free bead portions $T_1$ of the tire T. Upon further downward movement of the mold section 11 these edge portions 51a and 52a will cause the bead portion $B_1$ to move slightly upward of Figure 1 so as to permit clearance of the ring segments 51 and 52 with final positioning of the same occurring upon movement of the edge portions 51b and 52b across the inclined surface 21 of the lower mold section 12.

When the shaft 50 has moved further down towards the position of Figure 2, and when the position of Figure 2 has been reached, the ring segments 51 and 52 will be firmly positioned between the bead portions $B_1$ and $B_2$, of the tire T, with these ring segments 51 and 52 being disposed in a parallel plane as is clearly shown in Figure 2 of the drawings. During such movement the pin 41 will have moved downwardly in the slot 44 to result in compression of the spring 45 that is clearly shown in Figure 2 of the drawings.

In the condition of Figure 2, it will be noted that the entire ring assembly 10 is capable of axial shifting with respect to the tire T as a result of the telescopic connection between the members 40 and 42 with the ultimate floating position of the ring 10 being determined by the thickness of the respective bead portions $B_1$ and $B_2$ of the pneumatic tire being cured. Thus, an automatic compensatory adjustment is provided to meet situations where one bead section is under or oversized.

At this time the pressurized vulcanizing fluid may be admitted to the internal chamber 100 through 63 while condensate may be exhausted through conduit 64 in known manner.

When the curing cycle has been completed and it is desired to remove the cured tire from the mold, it is merely necessary that the mold section 11 be raised vertically by operation of the vulcanizing press. This initial separating movement between the mold sections 11 and 12 will cause a stripping of the tire T with respect to the upper mold section 11 as a result of the force exerted by the spring 45 which tends to maintain the sealing ring 10 in its flat condition with the bead portions 51b and 52b holding the lower bead portions $B_1$ against the design imparting cavity of the lower mold section 12.

After the mold section 11 has moved upwardly to a certain extent, the pin 41 will engage the upper portion of the slot 44 and will cause the shaft 50 to be vertically raised, with the result that the hinging or collapsing action will occur with respect to the segments 51 and 52 which will automatically effectuate their removal with respect to the tire T.

Also, in the preferred embodiment of the invention shown in Figure 3 of the drawings, effective sealing is assured with respect to the sealing ring 10 by having sealing strips 72, 72 provided at the point of contact between the component parts when the same are positioned as shown in Figure 3 of the drawings, with the sealing strips 72, 72 being carried by the ring segments 51 at its extreme arcuate ends so as to be received within the slots 73, 73, for example, of the ring segment 52. In this manner, upon hinging movement of the ring segments 51 and 52 to their closed position, a full and tight seal will be provided at the point of juncture indicated by the numeral 74 in Figure 3 of the drawing.

It will be seen from the foregoing that there has been provided a new and novel type of vulcanizing sealing ring capable of particular utilization in connection with the recapping of worn pneumatic tire casings.

It has been shown how specific construction recited above permits the automatic insertion and withdrawal of the ring with respect to the tire casing without the need of any manual positioning by the operator thereof.

While a full and complete description of the preferred form of the invention has been recited in accordance with the patent statutes, it is to be understood that substitutions and equivalents may be resorted to where required.

It accordingly follows that modifications of the invention may be resorted to without departing from the spirit hereof or the scope of the appended claims.

This application is a continuation-in-part of co-pending application Serial No. 583,777 filed May 9, 1956, by Adolph Frohlich and Edward J. Harris and is also a continuation-in-part of co-pending application Serial No. 565,721, filed February 15, 1956, by Adolph Frohlich and Edward J. Harris.

What is claimed is:

1. A vulcanizing press of the character described, comprising; a pair of complemental, relatively movable mold sections movable between open and closed positions; a first cylindrical member projecting axially of one said mold section; a second cylindrical member telescoped with respect to said first member in axially shiftable relationship therewith; a transverse frame member carried by the projecting end of said second frame member; a pair of semi-circular bead segments hinged together at their arcuate ends about said transverse frame member adjacent the opposed ends thereof; and means for moving said bead segments into coplanar relationship with each other upon closing of said press.

2. A vulcanizing press of the character described, comprising; a pair of complemental, relatively movable mold sections movable between open and closed positions; a pair of semi-circular bead segments hinged together at their arcuate ends about a common transverse member; connecting means projecting axially from one mold section and having the free end thereof secured to said transverse frame member; said connecting means including a pair of telescoping members, respectively secured to said mold section and said frame; said telescoping members being urged axially apart; and means for urging said telescoped members axially apart.

3. The device of claim 2 further characterized by the fact that the axial separation of said telescoped members is limited.

4. A vulcanizing press of the character described, comprising; a pair of complemental, relatively movable mold sections movable between open and closed positions; a first cylindrical member projecting axially of one said mold section; a second cylindrical member telescoped with respect to said first member in axially shiftable relationship therewith; a transverse frame member carried by the projecting end of said second frame member; a pair of semi-circular bead segments hinged together at their arcuate ends about said transverse frame member adjacent the opposed ends thereof; and means for moving said bead segments into coplanar relationship with each other upon closing of said press; said means for moving said bead segments into coplanar relationship with each other including a cammed surface provided on one said mold section and coacting with said bead segments upon closing of said press.

5. The device of claim 1 further characterized by the fact that said telescoped members are enclosed within a sealed cavity defined by said ring segments disposed in coplanar relationship and said mold sections when the same are closed.

6. A vulcanizing press of the character described, comprising; a pair of complemental, relatively movable mold sections movable between open and closed positions; a first cylindrical member projecting axially of one said mold section; a second cylindrical member telescoped with respect to said first member in axially shiftable relationship therewith; a transverse frame member carried by the projecting end of said second frame member; a pair of semi-circular bead segments hinged together at their arcuate ends about said transverse frame member adjacent the opposed ends thereof; and means for moving said bead segments into coplanar relationship with each other upon closing of said press; and at least one flexible conduit interconnecting opposed radial faces of at least one said bead segment.

7. A vulcanizing press of the character described, comprising; a pair of complemental, relatively movable mold sections movable between open and closed positions; a cylindrical member carried by one said mold section and being shiftable with respect thereto so as to project therefrom at variable distances; a transverse frame member carried by said projecting end of said cylindrical member; a pair of semi-circular bead segments hinged together adjacent their arcuate ends about said transverse frame member adjacent the opposed ends thereof; and means for moving said bead segments into coplanar relationship with each other upon closing of said press.

8. The device of claim 7 further characterized by the fact that said cylindrical member and said frame member associated therewith are shifted towards said mold section carrying the same upon closing of the press.

9. The device of claim 7 further characterized by the fact that said frame member is normally urged away from said mold section associated therewith.

10. The device of claim 9 further characterized by the fact that the extent of movement of said frame from said mold section is limited.

11. A bead ring for use in a vulcanizing press, comprising; a cylindrical member; a shaft extending transversely through said cylindrical member and having the opposed end portions thereof projecting radially beyond said cylindrical member; a pair of semi-circular bead segments hinged together at their arcuate ends about said shaft member adjacent the opposed edge portions thereof; and means for pivoting said bead segments into and out of coplanar relationship with each other; said bead rings defining a circular bead ring when disposed in coplanar relationship with each other.

12. The device of claim 11 further characterized by the fact that at least one said bead segment includes a flexible conduit interconnecting opposed radial surfaces thereof.

13. The device of claim 11 further characterized by the fact that said cylindrical member is telescoped over a second cylindrical member in axially shiftable relationship therewith.

14. The device of claim 13 further characterized by the fact that said telescoped cylindrical members are axially urged apart.

15. The device of claim 14 further characterized by the fact that said axial separation is limited.

References Cited in the file of this patent

UNITED STATES PATENTS

| | | |
|---|---|---|
| 1,700,889 | Heltzel | Feb. 5, 1929 |
| 1,989,363 | Iverson | Jan. 29, 1935 |
| 2,386,034 | Church | Oct. 2, 1945 |
| 2,571,258 | Kolins | Oct. 16, 1951 |
| 2,677,854 | Andreini | May 11, 1954 |